US00RE35092E

United States Patent [19]

Kojima

[11] E Patent Number: Re. 35,092

[45] Reissued Date of Patent: Nov. 21, 1995

[54] IGNITION COIL ASSEMBLY FOR INTERNAL COMBUSTION ENGINES

[75] Inventor: Masami Kojima, Chiryu, Japan

[73] Assignee: Nippondenso Co., Ltd., Kariya, Japan

[21] Appl. No.: 564,282

[22] Filed: Aug. 8, 1990

Related U.S. Patent Documents

Reissue of:

[64] Patent No.: 4,763,094
Issued: Aug. 9, 1988
Appl. No.: 128,218
Filed: Dec. 3, 1987

[30] Foreign Application Priority Data

Dec. 4, 1986 [JP] Japan ..... 61-289491

[51] Int. Cl.[6] ..... H01F 27/02

[52] U.S. Cl. ..... 336/92; 336/98; 336/107; 336/178

[58] Field of Search ..... 123/634, 621; 336/96, 98, 210, 105, 107, 165, 178, 198, 212, 92, 90

[56] References Cited

U.S. PATENT DOCUMENTS

| | | | |
|---|---|---|---|
| 4,000,483 | 12/1977 | Cook | 336/98 |
| 4,099,510 | 7/1978 | Perrier et al. | 336/96 |
| 4,146,857 | 3/1979 | Schleupen | 336/96 |
| 4,408,176 | 10/1983 | Nakamura | 336/96 |
| 4,509,032 | 4/1985 | Post | 336/98 |
| 4,509,033 | 4/1985 | Weiss et al. | 336/107 |
| 4,658,799 | 4/1987 | Kusaka et al. | 336/96 |
| 4,700,166 | 10/1987 | Bradt et al. | 336/198 |

FOREIGN PATENT DOCUMENTS

| | | | |
|---|---|---|---|
| 195998 | 2/1958 | Germany | 336/198 |
| 2024931 | 12/1971 | Germany | 336/96 |
| 58-138318 | 9/1983 | Japan . | |
| 60-912 | 9/1985 | Japan . | |
| 60-192313 | 9/1985 | Japan | 336/96 |

*Primary Examiner*—Thomas J. Kozma
*Attorney, Agent, or Firm*—Cushman, Darby & Cushman

[57] ABSTRACT

An ignition coil assembly for an internal combustion engine includes at least one first laminated core contained in a housing and having a plurality of first magnetic path connection end faces exposed to the inside of the housing and at least one second laminated core having a plurality of second magnetic path connection end faces each opposing to one of the first magnetic path connection end faces through a thin gap. A primary coil and secondary coil are wound on the second laminated core, and a plurality of soft waterproof layers are formed on inner walls of the housing to cover the first magnetic path connection end faces of the first laminated core.

12 Claims, 5 Drawing Sheets

IGNITION COIL ASSEMBLY FOR INTERNAL COMBUSTION ENGINES

Matter enclosed in heavy brackets [ ] appears in the original patent but forms no part of this reissue specification; matter printed in italics indicates the additions made by reissue.

The present invention relates to a resin-molded closed magnetic path ignigtion coil assembly for internal combustion engines of the type mounted on vehicles and more particularly to improvements in the waterproofing of such ignition coil assembly.

A conventional resin-molded closed magnetic path ignition coil assembly of the above type includes at least one first laminated core made by laminating a large number of substantially C-shaped steel strips, embedded in a housing made of a resin material and having surface portion exposed to the outside of the housing for ground terminal fastening purposes or for fastening an ignition coil to the engine and first magnetic path connecting end faces for magnetic path forming purposes. Also mounted in the housing is at least one I-shaped second laminated core made of silicon steel strips and having second magnetic path connection end faces each opposing one of the first magnetic path connection end faces through a small gap thereby forming along with the first laminated core, a magnetic path. A primary coil and a secondary coil and externally fitted on the second laminated core.

After these components have been mounted within the housing they are integrally fixed in place within the housing by use of a molding resin having electric insulation and heat resisting properties, e.g., epoxy resin.

When the resin-molded closed magnetic path ignition coil assembly of the above construction is used over a long period of time, cracks are caused in the molding resin filled in the magnetic gaps (0.15 mm–0.5 mm) between the first and second magnetic path connection end faces. In addition, a small gap is caused between the housing and the first laminated core by a thermal stress due to the difference in thermal expansion coefficient between the housing and the first laminated core. At this time, due to the deposition of water from the outside of the ignition coil assembly the water enters through the exposed surface portion of the first laminated core on the outside of the housing and the water penetrates to the second magnetic path connection end faces of the second laminated core through the thus formed small gap and through the first magnetic path connection end faces of the first laminated core. In this case, there is the danger of the water reaching the primary winding through the second laminated core. Particularly, if the water contains salt, there is the problem that the insulated coating of the primary winding is hydrolized so that the primary winding is short-circuited or a short-circuit is established between the primary winding and the second laminated core, thereby partially deteriorating the performance of the primary coil.

It is an object of this invention to provide an ignition coil assembly for internal combustion engines, which prevents the penetration of water to the second laminated core, prevents deterioration of the performance of the primary coil and improves the reliability of the primary coil.

To accomplish the above object, in accordance with the present invention, there is provided an ignition coil assembly for internal combustion engines including a housing made of an electrically insulating material, at least one first laminated core embedded in the housing and having surface portions exposed to the outside of the housing and magnetic path connection end faces exposed to the inside of the housing, at least one second laminated core having magnetic path connection end faces each opposing one of the magnetic path connection end faces of the first laminated core through a small gap and contained in the housing to form a magnetic path along with the first laminated core, a primary coil and a secondary coil which are wound on the second laminated core, a molding resin filled in the housing to insulated and fix in place the second laminated core and the primary and secondary coils, and a pair of soft waterproof layers formed on the inner wall surface of the housing to enclose the magnetic path connection end faces of the first laminated core.

With the construction described above, the internal combustion engine ignition coil assembly according to the invention has the following functions and effects.

Since the internal combustion engine ignition coil assembly of this invention includes the soft waterproof layers formed on the inner wall surfaces of the housing to enclose the magnetic path connection end faces of the first laminated core, a long-term use of the ignition coil assembly has no danger of causing cracks in the waterproof layers and thus it is possible to prevent the entry of water through the exposed surface portions of the first laminated core from the housing and hence the penetration of the water to the second laminated core from the second magnetic path connection end faces through the first magnetic path connection end faces of the first laminated core. This has the effect of preventing the insulating coating of the primary winding form being hydrolized, preventing shortcircuiting of the primary winding and the establishment of a short-circuit between the primary winding and the second laminated core and preventing deterioration of the performance of the primary coil.

Another effect of the internal combustion engine ignition coil assembly of this invention is the use of its simple method of forming the soft waterproof layers on the inner wall surface of the housing to enclose the magnetic path connection end faces of the first laminated core and therefore the assembling operation performance of the ignition coil assembly is impeded in no way, thereby making the ignition coil assembly of this invention well suited for mass production.

Further objects, features and advantages of the present invention will be apparent from the following detailed description taken in conjunction with the accompanying drawings in which.

The internal combustion engine ignition oil according to the invention will now be described with reference to the illustrated embodiment.

Referring now to FIGS. 1 to 4 showing a first embodiment of an internal combustion engine ignition coil assembly according tot he invention, there is illustrated a resin-molded closed magnetic-path ignition coil assembly for a four-cylinder engine.

Figure 1:
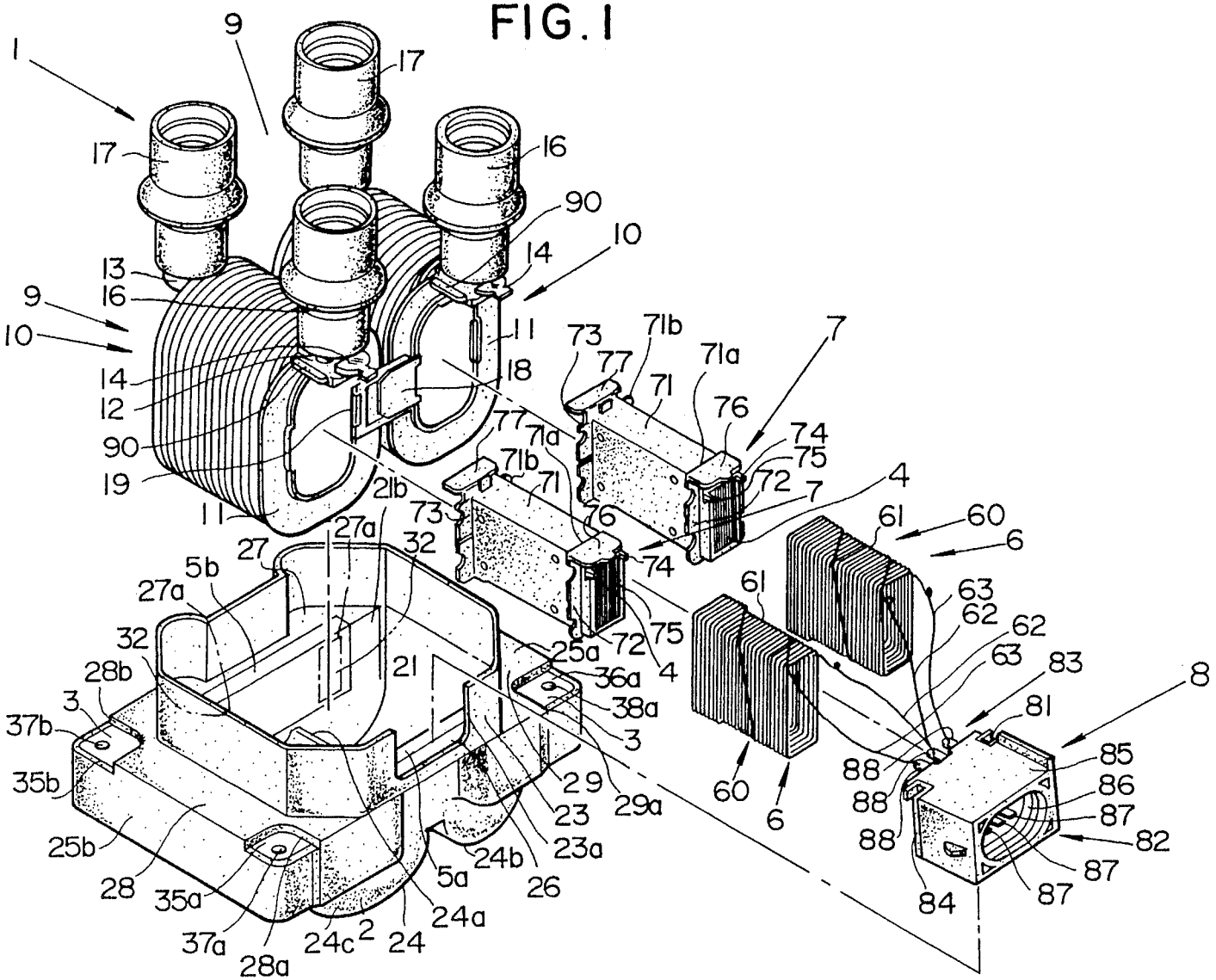
FIG. 1 is an assembly drawing of a closed magnetic path ignition coil assembly for vehicle engines according to an embodiment of an internal combustion engine ignition coil assembly according to the invention.

As shown in FIG. 1, a resin-molded closed magnetic path ignition coil assembly (hereinafter simply referred to as an ignition coil assembly) 1 according to the first embodiment includes a housing 2, a pair of substantially C-shaped first laminated cores 3, a pair of I-shaped second laminated cores 4, a pair of waterproof tapes 5a and 5b forming soft waterproof layers, a pair of primary coils 6 externally mounted on the second laminated cores 4, respectively, and a pair of secondary coils 9 externally mounted on the primary coils 6, respectively.

As shown in FIGS. 2A to 2C and 3, the ignition coil assembly 1 is completed by placing these component parts within the housing 2, filing a molding resin or heat-resisting thermoseting resin a, e.g., epoxy resin and setting the resin a under the application of heat. In the ignition coil assembly 1 of this embodiment, the first and second cores 3 and 4, the primary coils 6 and the secondary coils 9 are respectively provided in pair for the purpose of application to the four cylinder engine.

The housing 2 is made of a resin having excellent electric insulating properties and thermal shock properties, e.g., PBT (polybutylen telephthalate) resin and it includes a container-type accommodation portion 21 for receiving the primary coils 6 and the secondary coil 9 and a pair of core enclosures 25a and 25b which are respectively made intergral with the first laminated cores 3 and arranged along the outer periphery of the container-type accommodation portion 21.

Figure 2A:
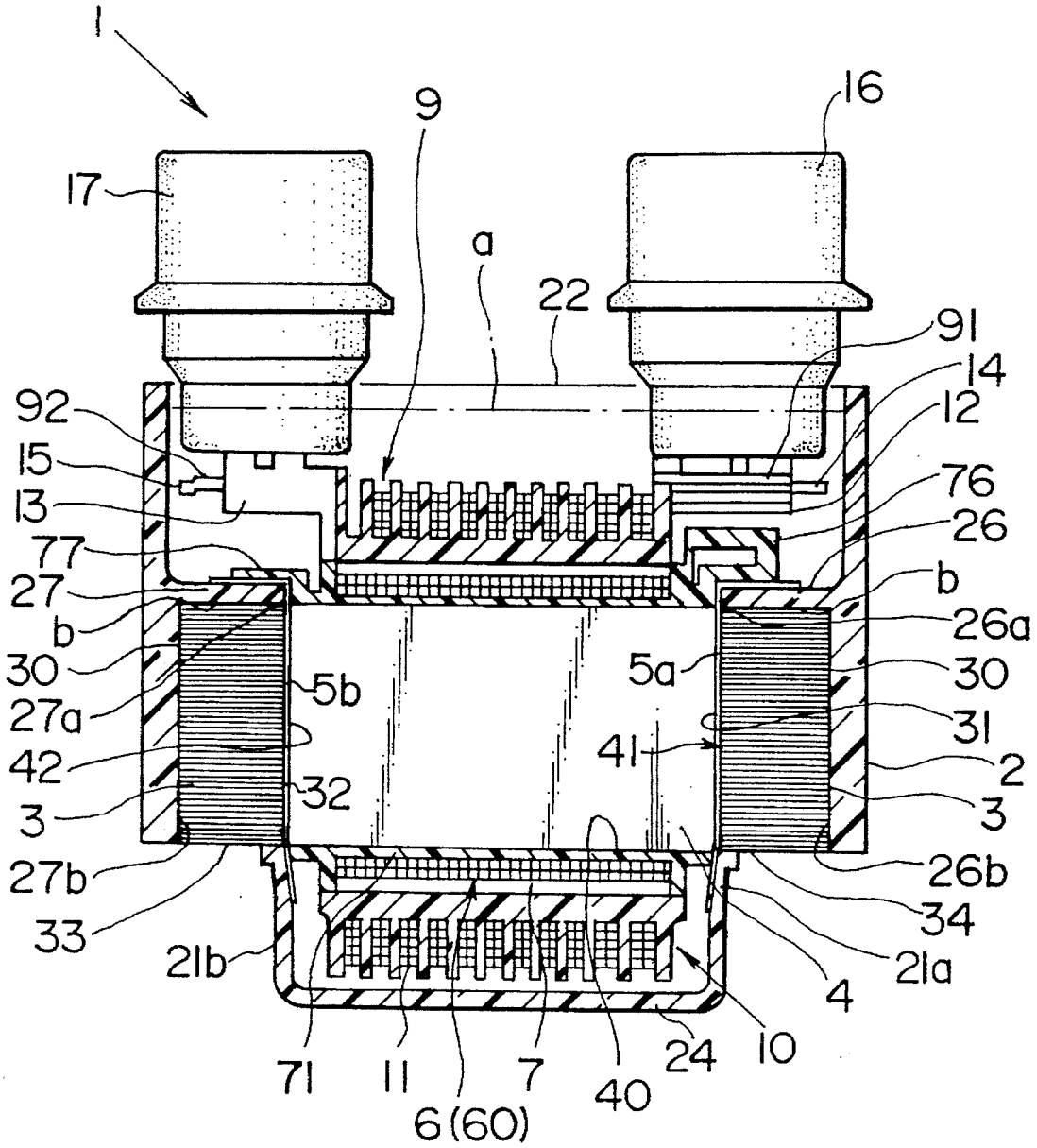
FIG. 2A is a side sectional view of the closed magnetic path ignition coil assembly for vehicle engines according to the first embodiment of the invention.
Figure 2B:
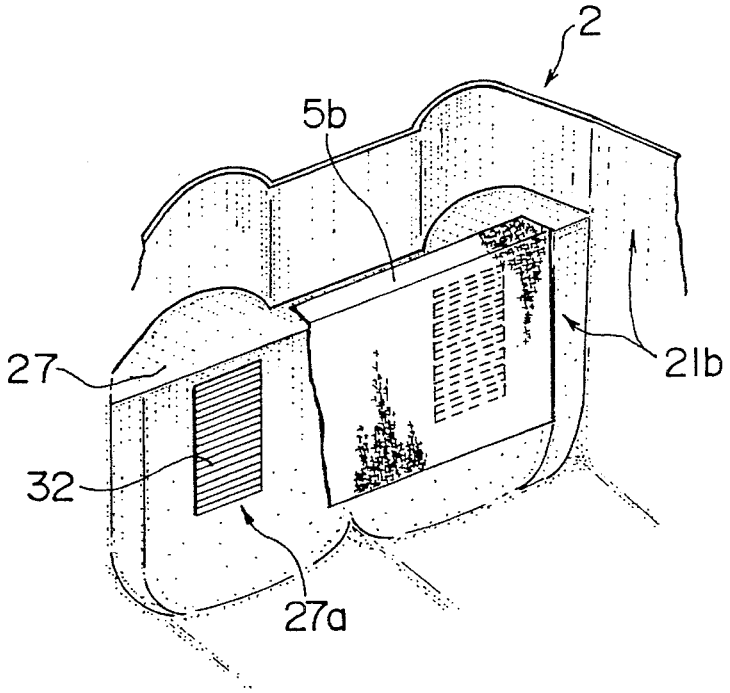
FIG. 2B is a partial perspective view of attached water proof tape and FIG. 2C is a partial sectional view of attached tape condition.

The container-type accommodation portion 21 includes an opening 22 opening upwards in the illustration of FIG. 2A, a side wall 23 formed with a notch 23a and a base plate 24 formed with curved portions 24b and 24c which are curved toward the outside of the housing and divided from each other by a partition 24a. The core enclosures 25a and 25b include step portions 26 and 27, a flange portion 28 formed with openings 28a and 28b opening to the outside from the upper surface of the housing 2 and a flange portion 29 formed with openings 29a and 29b opening to the outside from the upper surface of the housing. FIG 2b shows waterproof tape 5b adhered to an partially cut away. As shown, the step portions 26 and 27 are respectively formed on inner walls 21a and 21b of the container-type accommodation portion 21 and the inner wall 21a below the step portion 26 is formed with openings 26a while the inner wall 21b below the step portion 27 is formed with openings 27a which openings 26a and 27a open to the inside. The housing 2 has bottom openings 26b and 27b opening to the outside form its bottom surface.

Each of the first laminated cores 3 is made by transversely laminating a large number of silicon steel laminations 30 having a thickness of 0.35 mm to 0.50 mm and a width of 22 mm. The first laminated cores 3 are respectively embedded in the core enclosures 25a and 25b by molding a resin material around them. Therefore, a small gap b (0.1 mm to 0.5 mm) is inevitably caused between each first laminated core 3 and the housing 2 due to the difference in thermal expansion coefficient therebetween.

The first laminated cores 3 include first magnetic path connection end faces 31 and 32 exposed to the inside of the container-type accommodation portion 21 through the openings 26a and 27a, respectively, of the housing 2, surface portions 33 and 34 exposed to the outside through the openings 26b and 27b, respectively, of the housing 2 and grounding surface portion 35a, 35b, 36a and 36b exposed to the outside through the openings 28c, 28b, 29a and 29b, respectively, of the housing 2. The grounding exposed surface portions 35a, 35b, 36a and 36b are portion for connection with grounding terminals (not shown) and are respectively formed with holes 37a, 37b, 38a and 38b.

The second laminated cores 4 are each made by vertically laminating a large number of silicon steel lamination 40 of 0.35 mm to 0.50 mm thick and 22 mm wide to have substantially the same laminated thickness as the first laminated cores 3 and provide second magnetic path connection end faces 41 and 42 respectively facing through a small gap (0.3 mm to 1.0 mm) the first magnetic path connection end faces 31 and 32 of each first laminated core 3 and they are housed in the container-type accommodation portion 21 of the housing 2, thereby forming a closed magnetic-path magnetic circuit.

Figure 2C:
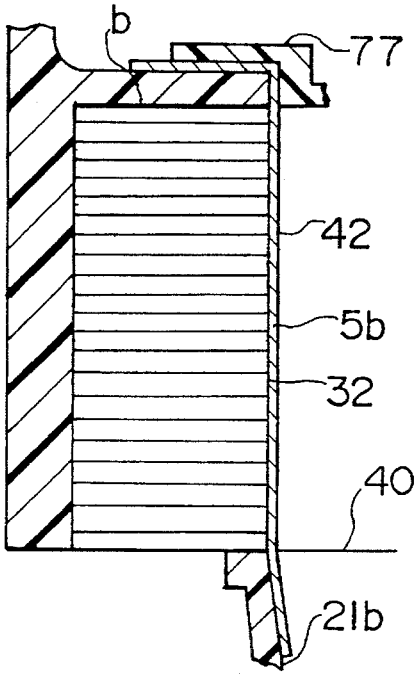
Figure 3:
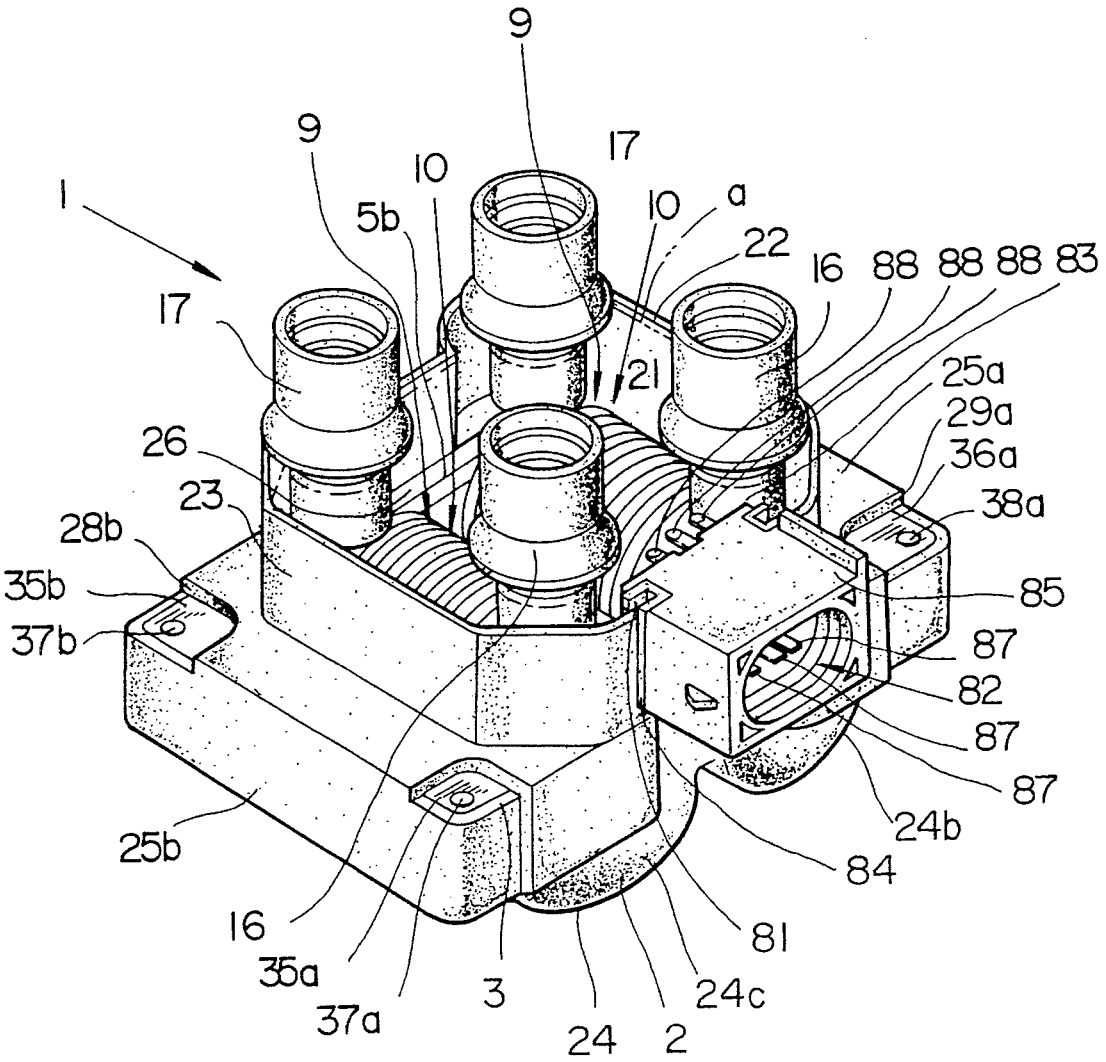
FIG. 3 is a perspective view of the first embodiment.
Figure 4:
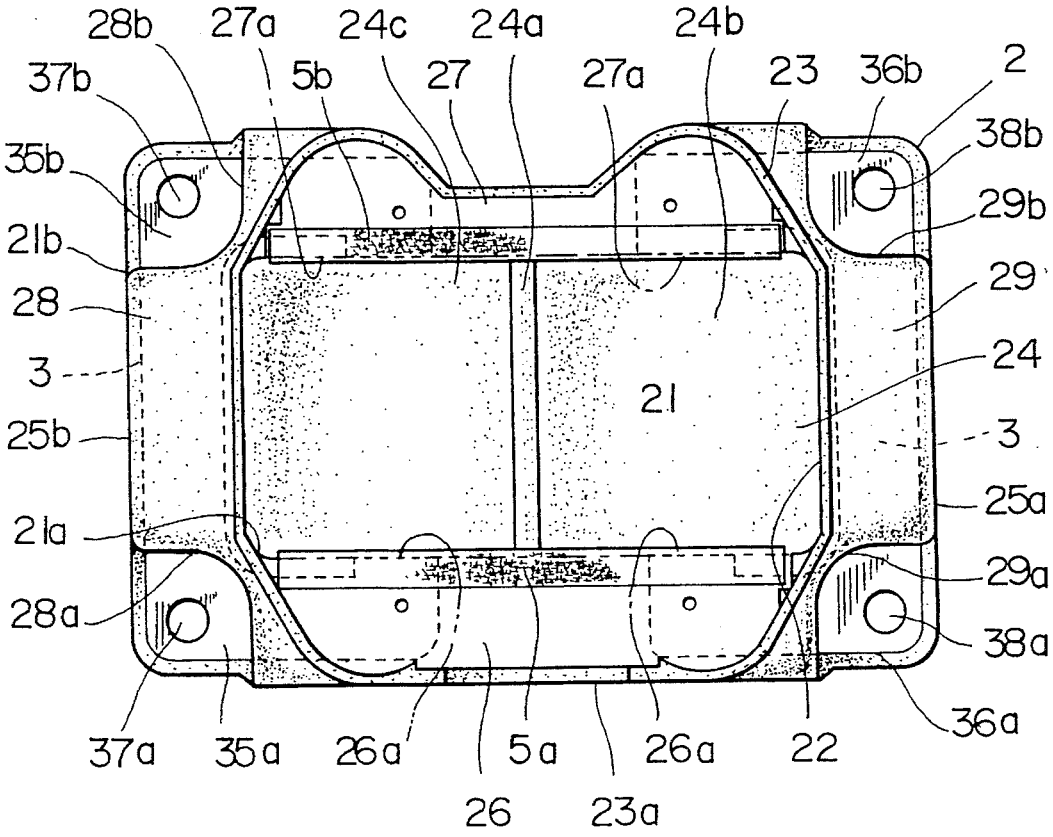
FIG. 4 is a front view of the housing section of the first embodiment.

As shown in FIG. 2C of a sectional view showing conditions of adhered waterproof tape, the first magnetic path connection end face 32 (31), the opening 27a (26a) and surrounding portion of inner wall 21b (21a) substantially lie in coplanar surface, to which surface the waterproof tape 5b (5a) is adhered. With the tape thus attached, the primary coil 6 having the second magnetic path connection end face 42 (41) of the second laminated core 4 is incorporated into the housing 2. Consequently, the waterproof tape 5b (5a) is made to interpose between the end faces 32 and 42. Waterproof tapes 5a and 5b are respectively adhered to extend from the step portions 26 and 27 over the inner walls 21a and 21b of the housing 2 and enclose the magnetic path connection end faces 31 and 32 of the first laminated cores 3. The waterproof tapes 5a and 5b have a thickness of 0.24 mm and also serves the function of uniformly forming a magnetic gap between the two end faces. In this embodiment, each of these tapes is a combination adhesive tape (No. 679S tape manufactured by Kabushiki-Kaisha Teraoka Seisakusho) made by successively bonding a rubber-type thermosetting adhesive layer, a polyester film layer and a rubber-type thermo-setting adhesive layer to a glass cloth. The glass clothes adhere satisfactory with the thermosetting resin a.

Each of the primary coils 6 includes a primary bobbin 7 externally fitted closely or molded integrally with each first laminated core 3 and a primary winding 60 wound on the primary bobbin 7.

The primary bobbin 7 is made integral with the [first laminated core 3] *second laminated core 4* by a molded thermosetting resin. The primary bobbin 7 includes a rectangular cylindrical portion 71, collars 72 and 73 respectively formed at ends 71a and 71b of the cylindrical portion 71 and winding portions 74 and 75 formed on the collar 72 for the purpose of winding thereon lead wires (connecting wires) for the primary winding 60 to which the primary dc current from the batter is supplied through a terminal which will be described later. THe collar 72 is formed with a flat engagement member 76 adapted for engagement with the step portion 26 of the housing 2. The collar 73 is formed with a flat engagement member 78 adapted for engagement with the step portion 27 of the housing 2.

Each of the primary windings 60 includes a wire portion 61 wound on the outer periphery of the cylindrical portion 71 of the primary bobbin 7, a connecting wire 62 having its one end connected through the winding portion 74 to a terminal box 8 providing primary winding connecting terminals and a connecting wire 63 having its other end connected to the terminal box 8 through the winding portion 75. The primary winding 60 is formed by layer winding for example about 100 to 200 turns of a synthetic resin-enameled copper wire of 0.5 to 1.3 mm in diameter on the cylindrical portion 71 of the primary bobbin 7. The winding specifications of the primary winding 60 are selected in accordance with the battery voltage, the presence or absence of a primary current limiting resistor and the performance specifications of the vehicle engine.

The terminal box 8 includes a resin box 85 having slots 81, a battery terminal section 82 and a primary winding terminal section 83. The slots 81 are formed in conformity with the notch 23a on the side wall 23 of the housing 2. A rubber sealing member 84 is fitted in each of the slots 81. The battery terminal section 82 includes battery terminals 87 located in an oval hole 86 of the box 85 which is provided on the battery side of the slots 81. The primary winding terminal section 83 is a provided on the battery side of the slots 81 and includes three primary winding terminals 88 to which are connected the connecting wires 62 and 63 of the primary windings 60.

Each of the secondary coils 9 includes a secondary bobbin 10 externally fitted on the primary winding 60 and a secondary winding 90 wound on the outer periphery of the secondary bobbin 10.

Each of the secondary bobbins 10 includes a comb spool 11 for winding the secondary winding 90 on the outer periphery thereof, extensions 12 and 13 extended to the sides from the upper portions of the ends of the comb spool 11 and high-tension terminals 14 and 15 respectively fastened to the extensions 12 and 13, and the secondary bobbin 10 is connected to high-tension towers 16 and 17 which are respectively mounted on the extensions 12 and 13 to hold the feed lines (not shown) for the spark plugs (not shown) connected to the high-tension terminals 14 and 15. In addition, locking members 18 and 19 are attached to the ends of the comb spools 11 to mount the two secondary bobbins 10 in the tightly locked from in the housing 2.

Each secondary winding 90 includes a connecting wire 91 wound on the outer periphery of the comb spool 11 and having is one end connected to the high-tension terminal 14 and a connecting wire 92 having its other end connected to the high-tension terminal 15. The secondary winding 90 is made by layer winding for example about 10000 to 20000 turns of a synthetic resin-enameled copper wire having a wire diameter of 0.04 mm to 0.06 mm. The secondary winding 90 supplies to the spark plug of the vehicle four-cylinder engine (not shown) a secondary high voltage (e.g., 15 to 25 kV) produced in accordance with the coil flux change caused by the interruption of the primary dc current supplied to the primary winding 60 by the circuit breaker.

The effects of the ignition coil assembly according to the present embodiment will now be described with reference to the drawings.

Generally, when the ignition coil assembly 1 is used over a long period of time, cracks are caused in the resin a filled between the first magnetic path connection end faces 31 and 32 and the second magnetic path connection end faces 41 and 42 with the passage of time. While the waterproof tapes 5a and 5b are interposed between the magnetic path connection end faces (31, 41; 32, 42) and good adhesion is ensured between their glass cloth surfaces and the resin a, the thickness of the resin a filled therebetween is not large and thus cracks tend to be caused easily. In addition, a small gap b is caused between the housing 2 and the first laminated cores 3 by a thermal stress due to the difference in thermal expansion coefficient between the housing 2 and the first laminated cores 3.

At this time, the deposition of water from the outside of the ignition coil assembly 1 causes the water to enter from the grounding exposed surface portions 35a, 35b, 36a and 36b of the first laminated cores 3 which are exposed to the outside of the housing 2 and reach the first magnetic path connection end faces 31 and 32 through the small gap b.

Thus, in the present embodiment the waterproof tapes 5a and 5b are respectively adhered to extend from the step portions 26 and 27 over the inner walls 21a and 21b of the housing 2, thereby enclosing the magnetic path connection end faces 31 and 32 of the first laminated cores 3. Then, while there is the difference in thermal expansion coefficient between the waterproof tapes 5a and 5b and the housing 2, there is no danger of causing any cracks in the waterproof tapes 5a and 5b due to their softness even if the housing 2 undergoes expansion and contraction.

As a result, the water reaching the first magnetic path connection end faces 31 and 32 is always blocked completely by the waterproof tapes 5a and 5b and the water is prevented from penetrating to the second laminated cores 4. Experiments conducted shown that the purpose of preventing the entry of water can be attained if the waterproof tapes 5a and 5b are respectively adhered to extend around the magnetic path connection end faces 31 and 32 to a width of at least 3 mm. In this way, the water is prevented from entering the primary windings 60 and particularly in the case of the salt-containing water, there is the effect of preventing the insulting coatings of the primary windings 60 from being hydrolized thus short-circuiting the primary windings 60 or establishing a short-circuit between the primary windings 60 and the second laminated cores 4, thereby partially deteriorating the performance of the primary coils 6.

Further, since the ignition coil assembly 1 of this embodiment employs the simple method of adhering the waterproof tapes 5a and 5b to the inner walls 21a and 21b of the housing 2 to enclose the magnetic path connection end faces 31 and 32 of the first laminated cores 3, it requires no additional epoxy resin, adhesive and the like, deteriorates its assembling operation performance in no way and is suited for mass production with the resulting reduction in cost.

Referring again to FIG. 4, a second embodiment of this invention can be made of the housing section of a closed-path ignition coil assembly for a vehicle engine. In this embodiment, soft plastic films 51 and 52 made for example of nylon, polyester, polyurethane, polyimide of polyfreon are respectively adhered to the inner walls 21a and 21b and the step portions 26 and 27 of the housing 2 to provide the required soft waterproof layers for enclosing the first magnetic path connection end faces 31 and 32 of the first laminated cores 3 which are respectively exposed through the openings 26a and 27a formed in the inner walls 21a and 21b.

I claim:

1. An ignition coil assembly for an internal combustion engine comprising:

a housing made of an electrically insulating material;

at least one first laminated core embedded in said housing and having a plurality of surface portions exposed to the outside of said housing and a plurality of magnetic path connection end faces exposed to the inside of said housing;

at least one second laminated core having a plurality of magnetic path connection end faces each opposing through a small gap one of said magnetic path connection end faces of said first laminated core and contained in said housing to form, along with said first laminated core, a closed magnetic path;

a primary coil and a secondary coil which are wound on said second laminated core;

a molding resin filling in said housing to insulate and fix in place said second laminated core, said primary coil and said secondary coil; and a plurality of soft waterproof layers formed on inner walls of said housing to cover said magnetic path connection end faces of said first laminated core.

2. An ignition coil assembly according to claim 1, wherein each of said waterproof layers is formed by adhering a soft plastic film to one of said magnetic path connection end faces.

3. An ignition coil assembly according to claim 1, wherein each of said waterproof layers is formed by adhering a waterproof tape made by successively bonding an adhesive layer, a polyester film layer and an adhesive layer to a glass cloth to one of said magnetic path connection end faces.

*4. An ignition coil assembly for an internal combustion engine comprising:*

*a single housing made of an electrically insulating material;*

*two first laminated cores embedded in said single housing and having a plurality of magnetic path connection end faces exposed to an inside of said housing, respectively;*

*two second laminated cores, in said single housing, having a plurality of magnetic path connection end faces each opposing one of said magnetic path connection end faces of said first laminated cores through a small gap and contained in said housing to form, along with said first laminated cores, a closed magnetic path, respectively;*

*two primary coils and two secondary coils which are in said single housing and are wound on said second laminated cores respectively;*

*a molding resin filling in said single housing to insulate and fix in place said second laminated cores, said primary coils and said secondary coils; and*

*a plurality of soft waterproof layers formed on inner walls of said housing to cover said magnetic path connection end faces of said first laminated cores.*

*5. An ignition coil assembly according to claim 4, wherein each of said secondary coils includes a secondary bobbin externally fixed on the primary winding and a secondary winding wound on an outer periphery of the secondary bobbin, and each said secondary bobbin having locking members which are attached to ends of the secondary bobbins to mount the two secondary bobbins in a locked form in the housing.*

*6. An ignition coil assembly according to claim 5, wherein each of said primary coils includes a primary bobbin externally fitted on each said second laminated core and a first winding wound on the primary bobbin, and each said primary bobbin having engagement members adapted for engagement of the housing.*

*7. An ignition coil assembly according to claim 6, wherein said housing is formed with a notch on the side wall thereof, and further comprising a terminal box which includes a resin box having slots formed in conformity with the notch and terminals connected to the primary windings.*

*8. An ignition coil assembly according to claim 4, wherein said housing is made of an electrically insulating and thermal shock resistant resin and includes a container-type accommodation portion for receiving the primary coils and the secondary coils and a pair of core enclosures and which are respectively made integral with the first laminated cores and arranged along an outer periphery of the container-type accommodation portion.*

*9. An ignition coil assembly according to claim 8, wherein said two first laminated cores are formed substantially C-shaped and said two second laminated cores are formed substantially I-shaped.*

*10. An ignition coil assembly according to claim 9, wherein each of said secondary coils includes a secondary bobbin externally fixed on the primary winding and a secondary winding wound on an outer periphery of the secondary bobbin, and each said secondary bobbin having locking members which are attached to ends of the secondary bobbins to mount the two secondary bobbins in a locked form in the housing.*

*11. An ignition coil assembly according to claim 10, wherein each of said primary coils includes a primary bobbin externally fitted on each said second laminated core and a first winding wound on the primary bobbin, and each said primary bobbin having engagement members adapted for engagement of the housing.*

*12. An ignition coil assembly according to claim 11, wherein said housing is formed with a notch on the side wall thereof, and further comprising a terminal box which includes a resin box having slots formed in conformity with the notch and terminals connected to the primary windings.*

* * * * *